United States Patent [19]
Gill

[11] 3,905,739
[45] Sept. 16, 1975

[54] APPARATUS FOR PRODUCING LENS BLOCKING TOOLS

[76] Inventor: Charles L. Gill, 1267 Arrowhead Beach, Dresden, N.Y. 14441

[22] Filed: Sept. 17, 1974

[21] Appl. No.: 506,715

Related U.S. Application Data

[62] Division of Ser. No. 311,399, Dec. 1, 1972, Pat. No. 3,866,660.

[52] U.S. Cl............... 425/405 R; 425/123; 425/808
[51] Int. Cl.² ........................ B29D 11/00; B29F 1/00
[58] Field of Search .................. 425/123, 405 R, 808

[56] References Cited
UNITED STATES PATENTS

| | | | |
|---|---|---|---|
| 1,534,671 | 4/1929 | Stead | 425/808 |
| 2,300,210 | 10/1942 | Dittmer | 425/808 |
| 2,424,235 | 7/1947 | Hoffer | 425/808 |
| 2,459,205 | 1/1949 | Wells et al. | 425/808 |
| 2,479,350 | 8/1949 | Haggart | 425/808 |
| 2,605,317 | 7/1952 | Tiscone | 425/123 X |
| 2,658,238 | 11/1953 | Rizzo | 425/123 X |
| 3,354,938 | 11/1967 | Carignan et al. | 425/808 X |
| 3,677,680 | 7/1972 | Etherington | 425/405 R X |

Primary Examiner—J. Howard Flint, Jr.
Attorney, Agent, or Firm—Shlesinger, Fitzsimmons & Shlesinger

[57] ABSTRACT

This apparatus produces molded blocking tools containing metal inserts having recessed ends opening on spherical surfaces on the tools. In one embodiment a removable plug has a shank mounted in one section of a mold, and a semi-spherical head projecting into the mold cavity. Each insert has in one end a circular recess which is secured by vacuum to the head while molding material is placed in the mold and solidified around the inserts, whereby the recessed ends of the inserts open on a semi-spherical cavity formed in the molded tool by the head of the plug. In another embodiment the recessed ends of the inserts are secured by vacuum to a spherical recess or cavity formed in one section of a mold, so that when molding material solidifies in the cavity around the inserts the resultant tool has a semi-spherical head in which the inserts are embedded. In each embodiment the circular recess in each insert has line contact with the spherical surface on which it is supported, so that the axes of the recesses extend through the center of the corresponding spherical surface formed on the tool.

7 Claims, 9 Drawing Figures

APPARATUS FOR PRODUCING LENS BLOCKING TOOLS

This is a division of my U.S. application Ser. No. 311,399, filed Dec. 1, 1972, now U.S. Pat. No. 3,866,660.

This invention relates to apparatus for producing novel blocking tools for accurately supporting a plurality of lens blanks in generating and polishing machines.

In the preparation of certain types of lenses, for example, those employed in cameras and the like, it has been customary to mount or block a plurality of lens blanks on a single tool, which is then used to support the blanks in generating and polishing machines which grind the desired surfaces on the blanks. For grinding convex surfaces the tool usually has thereon a segmental spherical surface in which a plurality of spaced, circular recesses are drilled or otherwise provided so that their axes pass through the center of curvature of the spherical tool surface. Lens blanks are then removably cemented in these recesses so that the surfaces to be ground project above the spherical surface of the tool. The tool is then mounted, for example, successively in generating, grinding and polishing machines, which produce identical convex surfaces on the projecting faces of the blanks.

For producing concave surfaces, a tool is used which has a segmental spherical recess in which a plurality of spaced, circular recesses are drilled or otherwise provided to have their axes extend through the center of the spherical recess. Lens blanks are then cemented in the circular recesses to project at one side above the bottom of the spherical recess; and the tool is then mounted successively in the generating and polishing machines which produce like concave surfaces on the projecting sides of the blanks.

In order properly to orient the circular recesses in tools of the type described above, it is essential that the drills, for example, that are used to form these circular recesses in the spherical tool surfaces, be very accurately positioned so that the axes of all the circular recesses in a given tool will intersect the center of its spherical surface. This assures, as nearly as possible, that the concave or convex surfaces that are ground on the several blanks on a given tool will have the same radius of curvature. The disadvantage of producing tools in this manner, however, is that it is extremely expensive to drill the necessary recesses in the tool bodies; and, moreover, in view of the high cost of preparing the tools, it has become customary for most manufacturers to save them for future use. Over a period of time, therefore, the cost of labor and space for storage of these tools can become prohibitive.

A primary object of this invention is to eliminate the high production and storage costs heretofore associated with blocking tools of the type described. To this end it is an object also to provide apparatus for producing an improved blocking tool which is substantially easier to manufacture and store than prior such tools.

A further object of this invention is to provide apparatus for producing a novel lens blocking tool having a plurality of lens-supporting metal inserts molded into a low-melting point body portion, which can be remelted after the tool has been used, so that the inserts can be reclaimed and saved for future use, if desired.

It is another object of this invention to provide novel apparatus for molding improved blocking tools of the type used to support lens blanks in generation and polishing machines which grind curved surfaces on the blanks.

A further object of this invention is to provide apparatus for producing a molded lens blocking tool having a re-meltable, low-melting point body and a plurality of re-usable, high-melting point, lens-supporting inserts molded into said body and having therein recesses for supporting lens blanks on the tools.

Other objects of the invention will be apparent hereinafter from the specification up to the recital of the appended claims, particularly when read in conjunction with the accompanying drawings.

Figures 1, 2:
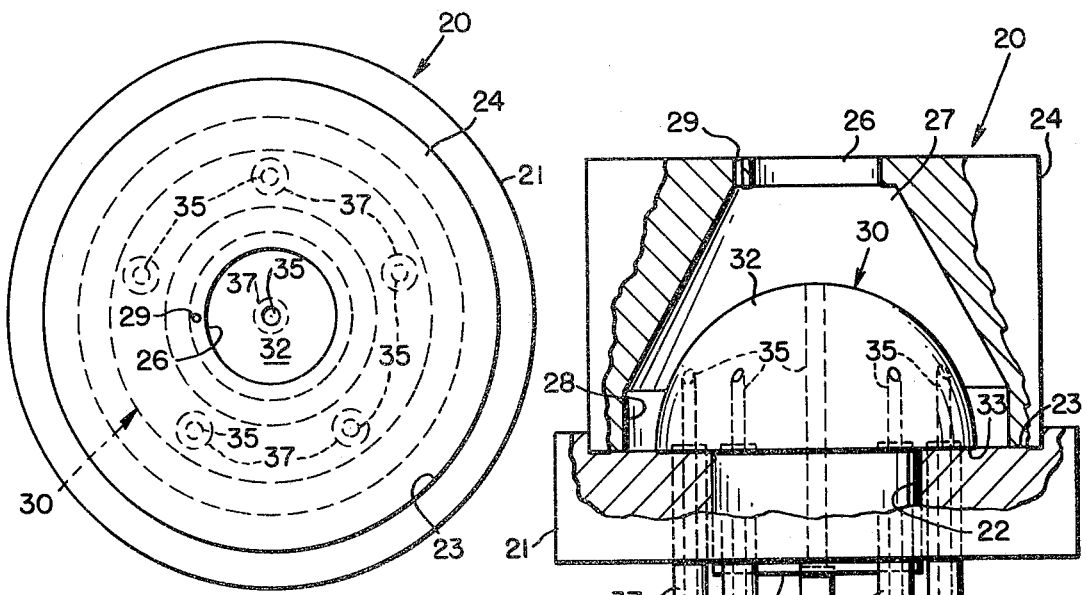
FIG. 1 is a plan view of a mold for making lens blocking tools of the type made in accordance with one embodiment of this invention.
FIG. 2 is a fragmentary elevational view of this mold, with portions thereof broken away and shown in section to illustrate the interior of the mold.

Referring now to the drawings by numerals of reference, and first to the embodiment illustrated in FIGS. 1 to 5, 20 denotes generally a mold comprising an annular base section 21 having an axial bore 22, and a cylindrical cover section 24, which is releasably seated at its lower end in a circular recess 23 formed in the upper end of section 21 coaxially thereof. In its upper end section 24 has coaxially thereof a circular opening 26, which communicates at its inner end with the upper, narrow end of a truncated-conical recess 27 that is formed coaxially in section 24 intermediate its end. The lower end of recess 27 registers with an enlarged-diameter counterbore 28 that is formed in lower section 24 coaxially of opening 26.

A small vertical opening or riser 29 is also formed in the upper section 24 adjacent and parallel to opening 26 for a purpose noted hereinafter.

Removably mounted between the mold sections 21 and 24 is a mushroom-shaped plug 30, having a cylindrical shank 31 which projects slidably and coaxially through the bore 22 in the lower mold section 21, and an enlarged, semi-spherically shaped head 32 which projects coaxially into the recess 27 in section 24. On its lower end head 32 has a plane, marginal surface 33 seated on the bottom of the recess 23 in section 21.

Plug 30 has therethrough six, spaced, vertically disposed bores or openings 35, one of which extends coaxially through the head and shank portions of the plug, and the others of which extend only through the head portion 32 of the plug at equi-angularly spaced points around its axial centerline. As shown more clearly in FIGS. 2 and 3, all of the bores 35 open at their upper ends on the curved surface of head 32 and at their lower ends on the plane surface 33 formed on the underside of the head at its junction with the shank 31. Also, the lower end of each bore 35 is sealingly connected to one end of one of a plurality of pipes or tubes 37, which are used to connect these bores to a vacuum supply as noted hereinafter.

Referring now to FIGS. 3 to 5, 40 denotes a generally disc-shaped metal insert, several of which are employed in conjunction with the mold 20. As shown more clearly in FIG. 5, each insert 40 has in its periphery a circular groove 41, and on opposite ends thereof circular end faces 42 and 43, which lie in spaced, parallel planes that extend at right angles of the axis of the insert. A circular bore or recess 44 extends coaxially and part-way into each insert centrally of its end face 42, and has a tapered or conically shaped inner end 45. A tapered or beveled surface 46 is formed around the outside of the recessed end of each insert 40 coaxially of its end face 42, so that the inner and outer peripheral edges of each surface 42 are disposed coaxially around the associated bore 44. The groove 45, and a plurality of shallow, parallel grooves 47 which are formed in the end surface 43 of each insert, help to secure the inserts against movement in the tool body, which is molded about the inserts as noted hereinafter.

In use, the upper section 24 of mold 20 is removed; and the tubes 37 are connected to a vacuum supply through individual valves (not illustrated) selectively to develop suction at the upper ends of the bores 35 where they open on the spherical surface of the plug head 32. The recessed ends of six inserts 40 are then positioned one by one over the upper ends of the bores 35 so that the inner peripheral edge of the surface 42 on each insert engages the curved surface of the head 32 around one of the bores 35. This circular, line contact between each surface 42 and the head 32 causes the recessed end of each insert to be held snugly and sealingly on the head 32 by the vacuum that is developed in the associated bore 35. Moreover, because of this line contact, each insert 40 will automatically position itself on the head 32 so that the axis of its recess 44 and hence that of the insert itself, will pass through the center C (FIG. 3) of the semi-spherically shaped head 32.

Figures 3, 4:
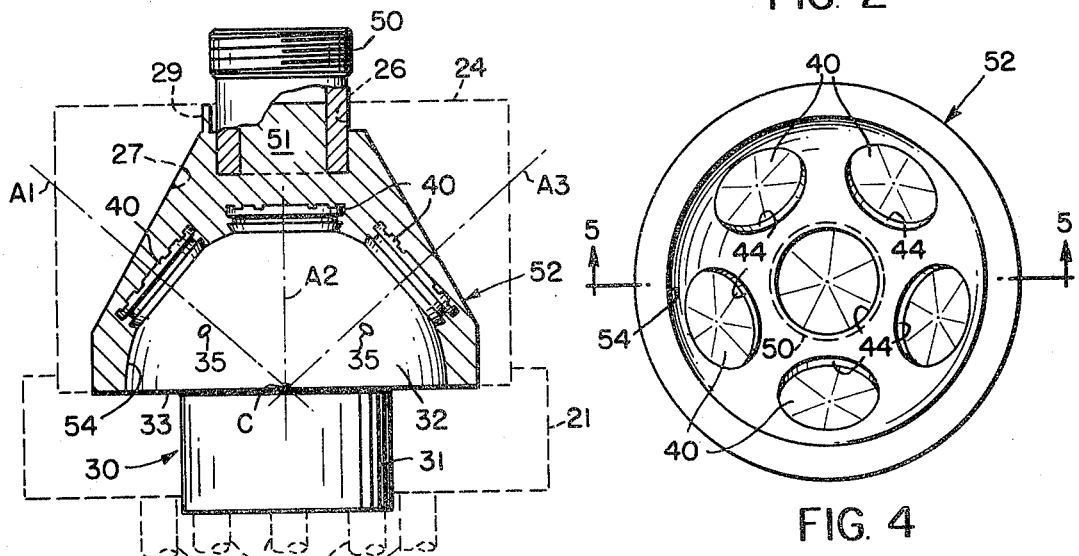
FIG. 3 is a view generally similar to FIG. 2 but illustrating the upper and lower sections of this mold in phantom, and showing, part in section and part in full, the tool prepared by this mold.
FIG. 4 is a bottom plan view of the molded tool shown in FIG. 3.

In FIG. 3, wherein by way of example only three inserts 40 are illustrated as they would appear upon being held by vacuum over three of the bores 35, it will be noted that the axes A1, A2, and A3 of the three inserts pass through the center C of the head 32. It will be apparent, that since the surface on head 32 is spherical, and since the inner peripheral edge of each surface 42 is disposed coaxially of the recess 44 which it surrounds, it is not necessary that the recessed end of each insert be centered exactly over the center of the upper end of the associated bore 35 in plug 30, it being necessary only that the upper end of the bore 35 open on the recess 44 of the associated insert.

After six inserts 40 have been secured by vacuum over the bores 35 in the head 32, a chucking sleeve 50 is secured intermediate its ends releasably and coaxially in the opening 26 in the upper mold section 24 so that a predetermined part of the sleeve projects above or exteriorly of section 24 to form a chucking shank on the finished tool as noted hereinafter. Thereafter section 24 is repositioned coaxially in the recess 23 in lower section 21, and a molten molding material 51, which has a melting point lower than those of the inserts 40 and the sleeve 50, (for example, an eutectic alloy) is poured through the bore in sleeve 50 to fill the cavity in the assembled mold around the inserts 40, as well as the riser 39 and the lower end of the bore in sleeve 50 to the level illustrated in FIG. 3. The molding material is thereafter allowed to cool and solidify, thus producing the tool 52, having a molded body portion in which the inserts 40 and one end of the sleeve 50 are embedded.

Figure 5:
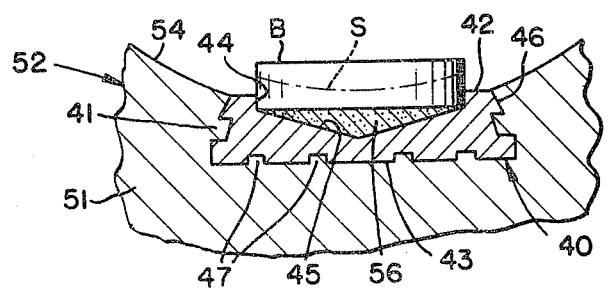
FIG. 5 is an enlarged, fragmentary sectional view taken along the line 5—5 in FIG. 4 looking in the direction of the arrows.

After the alloy 51 has solidified the mold sections 21 and 24 are separated; and the tool 52 is removed from section 24, thus exposing on one end of the tool a semi-spherical recess 54, and the six recessed ends of the embedded inserts 40, which open on recess 54. Thereafter six circular lens blanks B, only one of which is illustrated in FIG. 5, are secured by an adhesive 56 in the spaced recesses 44. Each blank B has a diameter only slightly less than that of the recess 44 in which it is secured, so that the blank automatically centers itself coaxially of the recess.

After the lens blanks have been blocked or mounted in the tool 52, the latter is chucked by means of the projecting end of sleeve 50 in, for example, a conventional lens generating or surfacing machine. Each blocked blank B is positioned coaxially of its associated recess 44, and since the axis of each such recess extends through the center C of the semi-spherical recess 54 that was formed by the head 32 coaxially of sleeve 50, the radii of curvature of the concave surfaces S (FIG. 5), which are ground on the blanks B during the generating operation, will also pass through the center C so that identical surfaces will be ground thereon.

Subsequent to the generation of the surfaces S on the lens blanks held by the tool 52, the tool may be removed from the generating machine and chucked successively, for example, in a fine grinding machine, and a plurality of polishing machines to finish the ground surfaces S on the blanks. When this operation has been completed, the adhesive 56, which may be of a variety having a melting point lower than the material from which the tool body was molded, may be heated to permit removal of the blanks B from the tool 52, after which other lens blanks may be adhered in the recesses 44 of the tool to have their surfaces ground as noted above. Furthermore, after an order has been filled and there is no further immediate need for using tool 52, the tool body represented by the blocking alloy 51 may be remelted, leaving its six inserts 40 which then may be stored together with the associated mold 20, for future use.

In most high speed blocking processes of the type described it is customary to employ a plurality of like blocking tools, so that some, for example, may be chucked in generating machines while others are having blanks cemented thereon, or are having finished blanks removed therefrom. In any event, each such tool must have an identical chucking shank so that all tools will be mounted in the same way in the several machines as they progress through the complete grinding operation. For this reason, each sleeve 50 must be inserted into the same position in opening 26 in mold section 24 so that in all tools 52 the sleeves 50 will have the same relative positions. This may be done, for example, by forming opening 26 with a slight truncated-conical configuration, and each sleeve 50 with a complimentary outer peripheral surface, so that each sleeve could be inserted into opening 26 from the inside surface of section 24 to the extent permitted by the mating conical surfaces on the sleeves 50 and opening 26, respectively.

Referring now to the modification illustrated in FIGS. 6 to 9, wherein like numerals are employed to denote elements similar to those employed in the first embodiment, 60 denotes a mold comprising an upper, cylindrical section 61, and a lower, cylindrical section 62, which is snugly and removably seated at its upper end coaxially in a circular recess 63 (FIG. 6) which is formed in the bottom of section 61 coaxially thereof. In its upper end section 62 has a central, semi-spherically shaped recess 65, the center C' (FIG. 6) of which lies on the common axial center line of sections 61 and 62. Block 62 also has therethrough six, circular bores or openings 66, one of which is disposed coaxially of section 62. The remaining five bores 66 are positioned in section 62 at equi-angularly spaced points around its axis, and open at their inner ends (upper ends in FIG. 6) on recess 65 adjacent its marginal edge. At its outer end each of the bores 66 is connected to one end of one of a plurality of pipes or tubes 67, which, as in the case of the first embodiment, are adapted to be connected to a vacuum supply for a purpose noted hereinafter.

Removably threaded into a blind bore 71 formed in the bottom of section 61 coaxially of its recess 63 is the externally threaded shank 72 (FIG. 6) of a plug 73. Plug 73 has an enlarged, semi-spherically shaped head 74, which overlies the bottom of recess 63, and projects into the mold recess 65 in spaced, coaxial relation thereto. A shoulder 75, which is formed on the plug 73 between its shank 72 and its head 74, engages the bottom of recess 63 in section 61 to maintain head 74 in slightly spaced relation to the bottom of recess 63, and assures that each shank 72 will always have the same relative position for all tools made in mold 60. Four shallow grooves or notches 77 are formed in the surface of head 74 at 90° intervals about its axis for a purpose noted hereinafter.

Removably threaded into the upper section 61 parallel to its axis are two, spaced bolts 78, each of which has therethrough an axial bore 79, which opens at its inner end on the void or cavity formed in the assembled mold between the confronting surfaces of the head 74 and recess 65.

Figure 9:
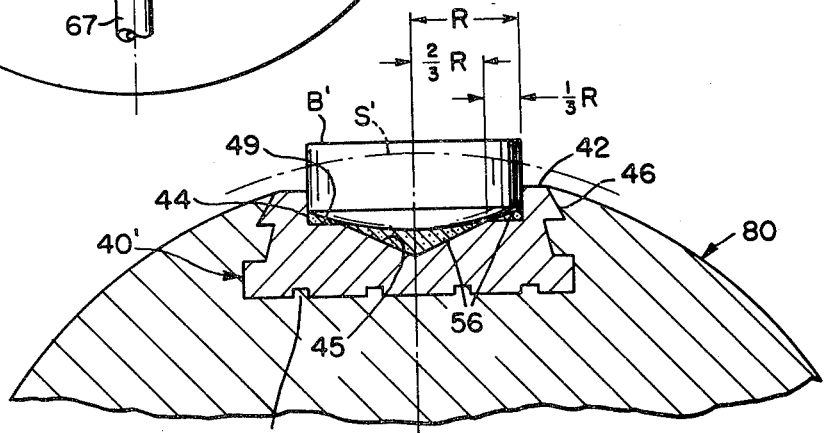
FIG. 9 is an enlarged, fragmentary sectional view taken centrally through the upper end of the blocking tool shown in FIG. 8, and illustrating a modified form of insert that may be employed in the tool.

FIG. 9 illustrates in section a slightly modified insert 40', several of which may be employed with mold 60 in lieu of the type of insert 40 described above. The modified insert 40' is similar to the insert 40, except that it has a flat, circumferential shoulder 49 formed at the bottom of recess 44 between the annular wall portion of the recess and its conical bottom 45. The radius of the conical bottom 45, where it intersects the shoulder 49, is two thirds of the radius R of the circular recess 44.

In use, the upper mold section 61 together with the plug 73 are removed from the bottom section 62; and the tubes 67 are connected to a vacuum supply to develop suction at the inner ends of the bores 66. The recessed ends of six inserts 40' are then positioned over the inner ends of the bores 66 in section 62, as illustrated for example by the single insert 40' shown in FIG. 6, so that the outer peripheral edge of the surface 42 around the recess 44 in each insert seats sealing with line contact against surface 65 to be held thereagainst by the suction generated in the associated bore 66. As in the previous embodiment, it is not necessary that the recessed end of each insert 40' be centered exactly over the inner end of the associated bore 66, it being necessary only that the inner end of a bore 66 communicate with the recess 44 in an insert. Also as in the previous embodiment, the axis of each insert 40' will automatically be aligned with the center C' of the mold recess 65.

Figure 6:
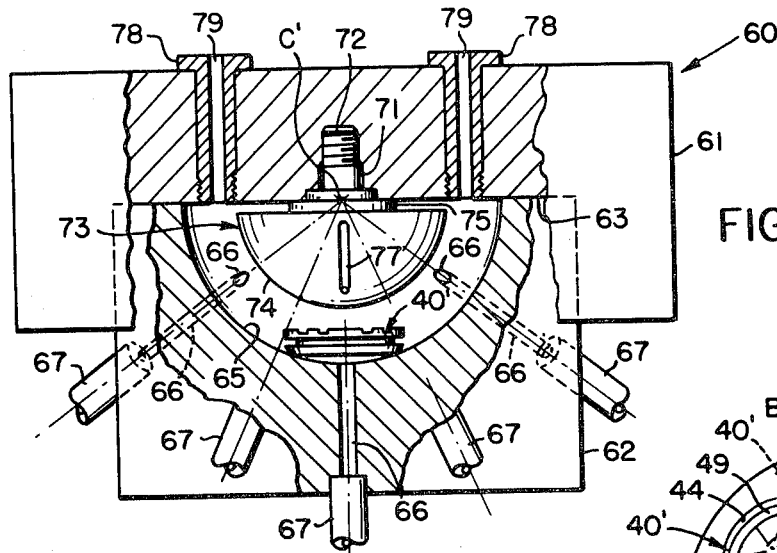
FIG. 6 is an elevational view of a modified mold, which is used to prepare a lens blocking tool made in accordance with another embodiment of this invention, portions of this mold being broken away and shown in section for purposes of illustration.
Figure 8:
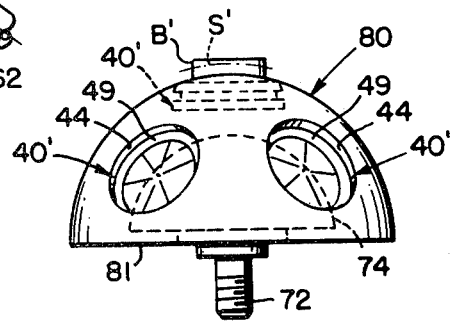
FIG. 8 is an elevational view of a lens blocking tool made by this modified mold.
Figure 7:
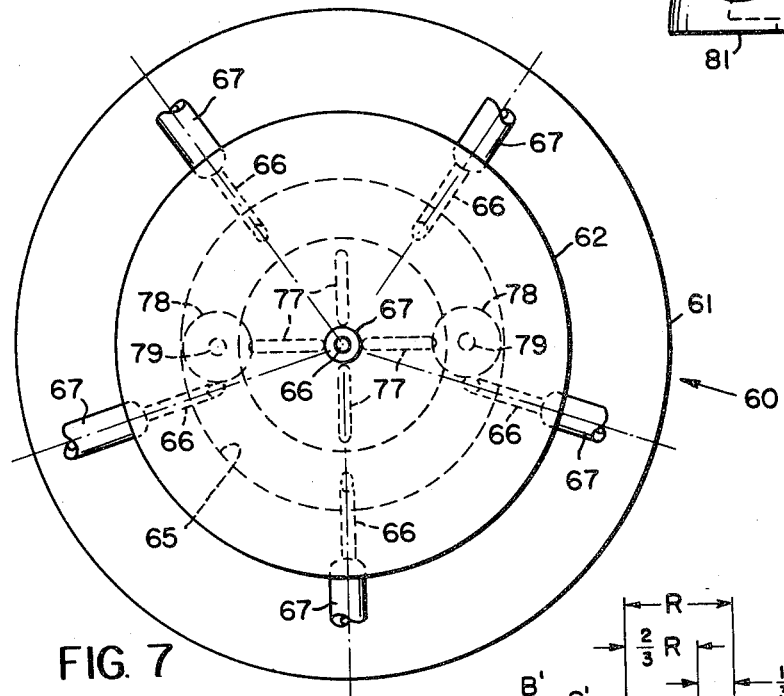
FIG. 7 is a fragmentary, bottom plan view of this modified mold.

In FIGS. 6 and 7 the axes of bores 66 have been illustrated as being disposed radially of the center C', but it will be apparent that the direction of these bores relative to the center C' is immaterial, it being necessary only that the inner ends of these bores open on the surface 65 at spaced points so that the inner end of each such bore can be covered properly by the recessed end of one of the inserts 40'.

After the inserts 40' have been secured by suction over the bores 66, the upper mold section 61 together with the plug 73 are repositioned over the lower mold section 62 as shown in FIG. 6. A molten molding material of the type noted in the first embodiment is then poured through the bore 79 in one of the bolts 78 to fill the cavity between the mold sections, and around the inserts 40 and the head 74 of plug 73. During this operation the bore 79 in the other bolt 78 functions as a riser, and when filled with molten molding material indicates that the mold cavity has been filled.

After the mold 60 has been allowed to cool to solidify the molding material, the upper mold section 61 is again removed from section 62, thereby withdrawing from recess 65 the completed tool 80 (FIGS. 8 and 9) containing six inserts 40', and the head 74 of plug 73. At this time the shank 72 of the plug is still threaded into section 61, and portions of the molding material have solidified in the bores 79 of the bolts 78. These bolts are therefore removed from the section 61 to shear the solidified molding material in their bores 79 from the plane underside 81 (FIG. 8) of the tool, after which tool 80 can be removed from section 61 merely by rotating the entire tool in a direction to unthread the shank 72 of the now-embedded plug 73 from the bore 71 in section 61.

After tool 80 has been removed from the mold 60, lens blanks may be secured as in the first embodiment by adhesive 56 in the recesses 44 of the six inserts 40' that are now embedded in the tool. By way of example, a single, semi-finished lens blank B' is shown secured in an insert 40' in FIGS. 8 and 9 with its finished side supported on the inner peripheral edge of the shoulder 49. When six such blanks have been secured in the tool recesses 44, the threaded shank 72 which is now an integral part of the tool, is used to mount the tool successively in generating, fine grinding, and polishing machines of the type described above. These operations will produce on the upper or outer ends of each blank B' identical convex surfaces of the type shown by broken lines at S' in FIGS. 8 and 9. Also as in the first embodiment, when the tool 80 is no longer needed, its body may be remelted leaving the inserts 40' and the plug 73, which together with the mold 60 may be stored for future use. When a plurality of tools are made from mold 60, the shoulder 75 on plug 73 will assure proper axial positioning of the chucking shank relative to the molded tool body.

The plug 73 is made from a material which has a melting point higher than that of the molding material which is used to mold the tool body. Moreover, since the shank 72 is used to chuck the tool 80 in the surfacing machines, it is essential that it be made from a hardened steel to minimize wear. For economy, therefore, it may be desirable to make the shank from a material different from that of the head 74, in which case the shank may be threaded or otherwise secured at one end in an axial blind bore (not illustrated) in the bottom of head 74 to project therefrom as shown in FIG. 6.

Although two different types of inserts 40 and 40' have been disclosed, it will be apparent that either type of insert may be employed with either of the molds 20 and 60. The advantage of the insert 40' is that when a semi-finished blank is blocked thereon for grinding, its finished side is supported by line contact two thirds of the radial distance from its centerline so that any undesirable flexing of the lens during grinding is minimized.

From the foregoing it will be apparent that the instant invention provides a relatively simple and inexpensive tool for blocking lenses of the type described prior to the grinding of convex or concave surfaces thereon. The use of molded tools with retrievable inserts and reusable chucking shanks, obviates the need for the expensive machining stages that were heretofore required to provide properly oriented recesses and chucking surfaces in the tools. These novel tools, moreover, are substantially more inexpensive than prior such tools; and, since the chuck shanks and inserts 40, 40' are retrievable after use, merely by melting down the tool bodies, the method and apparatus disclosed herein enable a substantial reduction in the storage facilities heretofor required for such tools.

Unlike known processes in which extreme care must be taken during the turning of the chucking shanks on a blocking tool, and during the drilling of each spot or recess in its spherical blocking surface, the preparation of the herein disclosed molds and associated chuck shanks and inserts 40 and 40' are the only operations which require the maintenance of close tolerances. Once the chucking members 50, 73 and the molds 20 and 60 have been prepared, and the inserts 40 and/or 40' have been produced on, for example, a screw thread machine, subsequent operations, such as the positioning of the inserts in the molds, and the actual molding and blocking operations, do not require a great deal of care, since the surfaces 42 on the inserts will automatically seat themselves with line contact on a respective spherical surface so that the axes of the inserts extend through the center of the surface. And, upon being blocked, the blanks fit snugly in the associated recesses 44 to prevent undesirable wedging of a blank during finishing, a fault which is very prevalent in grinding operations which rely upon known blocking processes. Elimination of wedging, furthermore, obviates the centering operations that were heretofore required to correct lenses that were improperly ground because of wedging.

Another advantage of using the molds 20 and 60 is that each insert 50 or 73, which is subsequently used for chucking purposes, can be quickly and accurately inserted into its proper place in a mold section so that the portion thereof subsequently used for chucking purposes, will always be disposed in the same axial position relative to the body of each tool prepared in a mold, thus assuring that each tool will be chucked in an identical manner in each generating machine used.

To reduce wedging to a minimum it may be desirable to employ pre-rounded, flat glass lens blanks ground to accurate diameters, thereby assuring a snug fit of the blanks in the recesses 44. The additional cost of such blanks will be more than offset by the savings afforded by use of the molded tool disclosed herein. For even further accuracy, the inserts 40 and 40' may be manufactured from a metal having a coefficient of thermal expansion equal to that of the glass lens blanks that are to be blocked thereon, so that when heat is applied to the tool, for example to melt the adhesive which retains the blanks in the tool, both the blanks and the inserts will expand and contract in unison, so that a blank will not become physically strained in a recess 44 during blocking.

It is to be understood that it is not necessary to manufacture the inserts 40 and 40' from metal. For example, the inserts could be made from a plastic, or from a molded ceramic material having a coefficient of thermal expansion approximately equal to that of the lens blanks blocked on the tools. Moreover, it will be apparent that the tool surfaces formed by the head 32 on plug 30 and the recess 65 in section 62 may be other than semi-spherical in configuration without departing from this invention, provided, however, that each of these surfaces form at least part of a sphere, the center of which lies on the axis of the associated chucking shank 50 or 72.

While only certain embodiments of the invention have been disclosed in detail herein, this application is intended to cover any further modifications which may be readily apparent to one skilled in the art, or which fall within the scope of the appended claims.

Having thus described my invention, what I claim is:

1. Apparatus for producing a lens blocking tool, comprising
   a pair of mold sections releasably connected together,
   a projection on one of the sections extending into a cavity in the other section in spaced, confronting relation thereto,
   one of the confronting surfaces on said projection and said other section, respectively, being segmental spherical in configuration,
   a plurality of inserts, each having in one end a circular recess for accommodating a lens blank,
   means for releasably securing the recessed ends of said inserts on said segmental spherical surface with the open ends of said recesses sealed by said surface, and with the axes of said inserts extending through the center of curvature of said surface, and
   means for connecting said cavity with a supply of fluid molding material disposed to fill the mold cavity and solidify around said inserts.

2. Apparatus as defined in claim 1, wherein
   said other section has therein a plurality of spaced ducts which open at one end on said segmental spherical surface to be covered by the recessed ends of said inserts, and
   said means for securing said inserts on said surface includes means for connecting the opposite ends of said ducts to a vacuum supply to hold said inserts on said surface by suction.

3. Apparatus as defined in claim 1, wherein said segmental spherical surface is on said projection.

4. Apparatus as defined in claim 1, wherein said segmental spherical surface is on said other section and defines at least part of said cavity.

5. Apparatus as defined in claim 1, wherein said projection is a plug having a cylindrical shank removably seated in a bore in said one section coaxially of said segmental spherical surface, and having an enlarged-diameter head projecting into said cavity.

6. Apparatus as defined in claim 5, wherein said cavity is segmental spherical in configuration, said other section has therein a plurality of spaced ducts opening at one end on said cavity and at their opposite ends exteriorly of said mold for connection to a vacuum supply, and the head of said plug is spaced from the adjacent surface of said one section, when said shank is seated in the bore in said one section, whereby said head becomes embedded in said molding material, when the latter solidifies in said cavity.

7. Apparatus as defined in claim 5, wherein the head of said plug is segmental spherical in configuration and is seated around its marginal edge against the adjacent surface of said one section, when the shank of said plug is seated in the bore in said one section, said plug has therein a plurality of spaced ducts opening at one end on said head and at their opposite ends exteriorly of said mold for connection to a vacuum supply, and a cylindrical member is removably mounted intermediate its ends in a bore in said other section to project at one end exteriorly of said mold, and to project at its opposite end into said cavity coaxially of said head, whereby said opposite end of said member becomes embedded in said blocking material, when the latter solidifies in said cavity.

* * * * *

UNITED STATES PATENT OFFICE
CERTIFICATE OF CORRECTION

Patent No. 3,905,739      Dated September 16, 1965

Inventor(s) Charles L. Gill

It is certified that error appears in the above-identified patent and that said Letters Patent are hereby corrected as shown below:

On the title page, column 1, after the inventor's name and address insert:

--[73] Assignees: Harris, Beach & Wilcox, Rochester, N. Y.; Angelo Pelino, Rochester N. Y.; a part interest to each.--.

Signed and Sealed this

*Eleventh* Day of *March 1980*

[SEAL]

*Attest:*

SIDNEY A. DIAMOND

*Attesting Officer*      *Commissioner of Patents and Trademarks*